United States Patent

Sitbon et al.

[11] Patent Number: 5,951,634
[45] Date of Patent: *Sep. 14, 1999

[54] OPEN COMPUTING SYSTEM WITH MULTIPLE SERVERS

[75] Inventors: Gérard Sitbon, Vitry; François Urbain, Paris; Thérése Saliba, Montigny le Bretonneux, all of France; Richard A. Fawcett, Sr., Phoenix, Ariz.

[73] Assignee: Bull S.A., Louveciennes, France

[*] Notice: This patent issued on a continued prosecution application filed under 37 CFR 1.53(d), and is subject to the twenty year patent term provisions of 35 U.S.C. 154(a)(2).

[21] Appl. No.: 08/495,397

[22] Filed: Jun. 28, 1995

[30] Foreign Application Priority Data

Jul. 13, 1994 [FR] France .................................. 94 08764

[51] Int. Cl.⁶ ...................................................... G06F 9/00
[52] U.S. Cl. .......................... 709/105; 709/100; 709/102; 709/104
[58] Field of Search ..................................... 709/102, 100, 709/104, 105

[56] References Cited

U.S. PATENT DOCUMENTS

| | | |
|---|---|---|
| 5,249,290 | 9/1993 | Heizer . |
| 5,452,445 | 9/1995 | Hallmark et al. ....................... 395/600 |
| 5,452,459 | 9/1995 | Drury et al. ............................ 395/700 |
| 5,463,625 | 10/1995 | Yasrebi ................................ 370/85.13 |
| 5,553,291 | 9/1996 | Tanaka et al. ........................... 395/700 |
| 5,592,664 | 1/1997 | Starkey ....................................... 707/1 |
| 5,664,106 | 9/1997 | Caccavale .......................... 395/200.54 |
| 5,694,546 | 12/1997 | Reisman ................................... 395/712 |

FOREIGN PATENT DOCUMENTS 0601579  6/1994  European Pat. Off. .

OTHER PUBLICATIONS

"A Dynamic Load Balancing Policy with a Central Job Dispatcher" Distributed Computing Systems, 1991 International Conference, Hwa–Chun Lin et al.

IEEE Transactions on Computers, vol. 39, No. 10, Oct. 1990, New York US pp. 1232 –1250 F. Bonomi Et A.Kumar "Adaptive Optimal Load Balancing in a Nonhomogeneous System with a Central Job Scheduler" *abstract*.

Patent Abstracts of Japan vol. 12, No. 307 (P–747) (3154) Aug. 22, 1988 & JP–A–63 076 051 (Fujitsu Ltd) Apr. 6, 1988 *abstract*.

Primary Examiner—Majid A. Banankhah
Attorney, Agent, or Firm—Kerkam, Stowell, Kondracki & Clarke, P.C.; Edward J. Kondracki

[57] ABSTRACT

An open computing system including a central client system and a plurality of server systems connected through a network, wherein the servers each include load calculators for calculating the load on the server at predetermined first sampling instants, a load rate calculator for determining the progress rate of the load on each server and memory for storing the load and the progress rage. The client includes means for polling, which at predetermined second sampling instants, requests each server to furnish the progress rate of the load and an average load over a predetermined number of first sampling instances, memory for storing the progress rate of the load and the average load, and a server selector for selecting the least loaded server to provide services for an application running on the client. The system optimizes the selection of servers in a multi-server system.

8 Claims, 3 Drawing Sheets

OPEN COMPUTING SYSTEM WITH MULTIPLE SERVERS

BACKGROUND OF THE INVENTION

The present invention relates to an open computing system with multiple servers. The invention is most particularly applicable to systems whose various constituent elements belong to heterogenous computing environments, for example distributed environments of the DCE type (English acronym for Distributed Computing Environment), described in the publications "OSF Distributed Computing Environment Rationale" by the Open Software Foundation, Inc., dated May 14, 1990, and "Distributed computing environment, an overview," of January, 1992, or of the non-DCE type (for example so-called "proprietary" systems, such as those which use the GCOS7 and GCOS8 operating systems available from the assignee of the instant invention).

The current trend in the development of modern computing systems is to form such a system by means of an association between a central system called a "host system" or "client system" or more simply "client," on one hand, and a plurality of "server systems," more simply called "servers," on the other hand. Any user of the computing system can run extremely varied types of applications on the central system. These applications call services which furnish the data necessary for the processing of a problem or problems they are handling, which services are available through the servers. These servers are also called "allies". Thus, the instant invention is particularly directed to a multiple-ally distributed computing system.

One example embodiment such a system is formed by the association of a central system of the DPS7000 or 9000 type and servers of the DPX-20 type, all of which are available from the assignee of the instant invention. The central system, which will henceforth be called "client" in the text which follows, communicates with its allies by means of a known, standardized type of network, for example the ETHERNET type (ISO standard 8802.3), or the FDDI type (ANSI standard X3T9-5), etc. Each of the allies can furnish the same type of services to the client.

In current practice, when an application being run requires the utilization of a particular service, the client proceeds in the following manner:

either the client chooses the ally which will furnish it with this service in a purely random way and assigns the service this job, or, the client makes a circular choice from among all its allies, that is, it assigns the allies in turn, and always in the same temporal order, the job of furnishing the services successively required by the application or applications: Thus, if the client has three allies, it assigns the job of furnishing services required first in chronological order by a first application to ally No. 1, the job of furnishing services required second in chronological order by a second application (or possibly by the same first application) to ally No. 2, the job of furnishing services required third in chronological order by a third application to Ally No. 3, and so on, in the following recurring order: ally No. 1, No. 2, No. 3, No. 1, etc.

In either of the above two cases, it is clear that on one hand, neither the work of the client nor that of the allies is optimized in terms of its chronological order, and that on the other hand, the capabilities of the allies with regard to throughput and performance are not utilized at their maximum level.

SUMMARY OF THE INVENTION

The present invention overcomes these disadvantages by advantageously using a calculation of the load of each of the allies when assigning allies. In accordance with the instant invention, each of the allies calculates its own load in accordance with criteria specific to each application, as well as its foreseeable progress over time, and transmits these two factors to the client. When a particular application requires the services of a server, the client chooses the server which would be least loaded during the period of time in which the services would have to be rendered, and assigns that server the job of furnishing the services requested.

According to the invention, the instant open computing system with multiple servers, includes a first central system called a "client" associated by means of a communication network with a plurality of server systems, wherein the client is running a plurality of applications which use the services available through all or some of the servers. The client and the servers belong to heterogenous computing environments (computing environments of the distributed, DCE type or of the non-distributed, non-DCE type). The system further includes:

1) at the level of each server:

load calculating means which, at predetermined first sampling instants, occurring at a of period X, calculates for each server the load the server carries as a function of the rate of utilization of the principal elements which constitute the server, on one hand, and of the network, on the other hand, means for calculating the progress rate of the load at the first sampling instants (slope of the load line)

means for memorizing the load and its progress rate at first sampling instants, 2) at the level of the client:

a polling process which, at predetermined second sampling instants occurring at a period of Y, requests each server to furnish it with the slope and the average of the load calculated from a predetermined number of the first sampling instances having the period X, second means for memorizing the slope and the average of the load of all the servers, at these same second sampling instances, controlled by this process.

Means for choosing the least loaded server during the estimated period in which the services requested by the application being run would have to be rendered.

BRIEF DESCRIPTION OF THE DRAWINGS

Other characteristics and advantages of the present invention will become apparent in the following description, given as a non-limiting example, which refers to the appended drawings. In these drawings.

DESCRIPTION OF THE PREFERRED EMBODIMENTS

Figure 1:
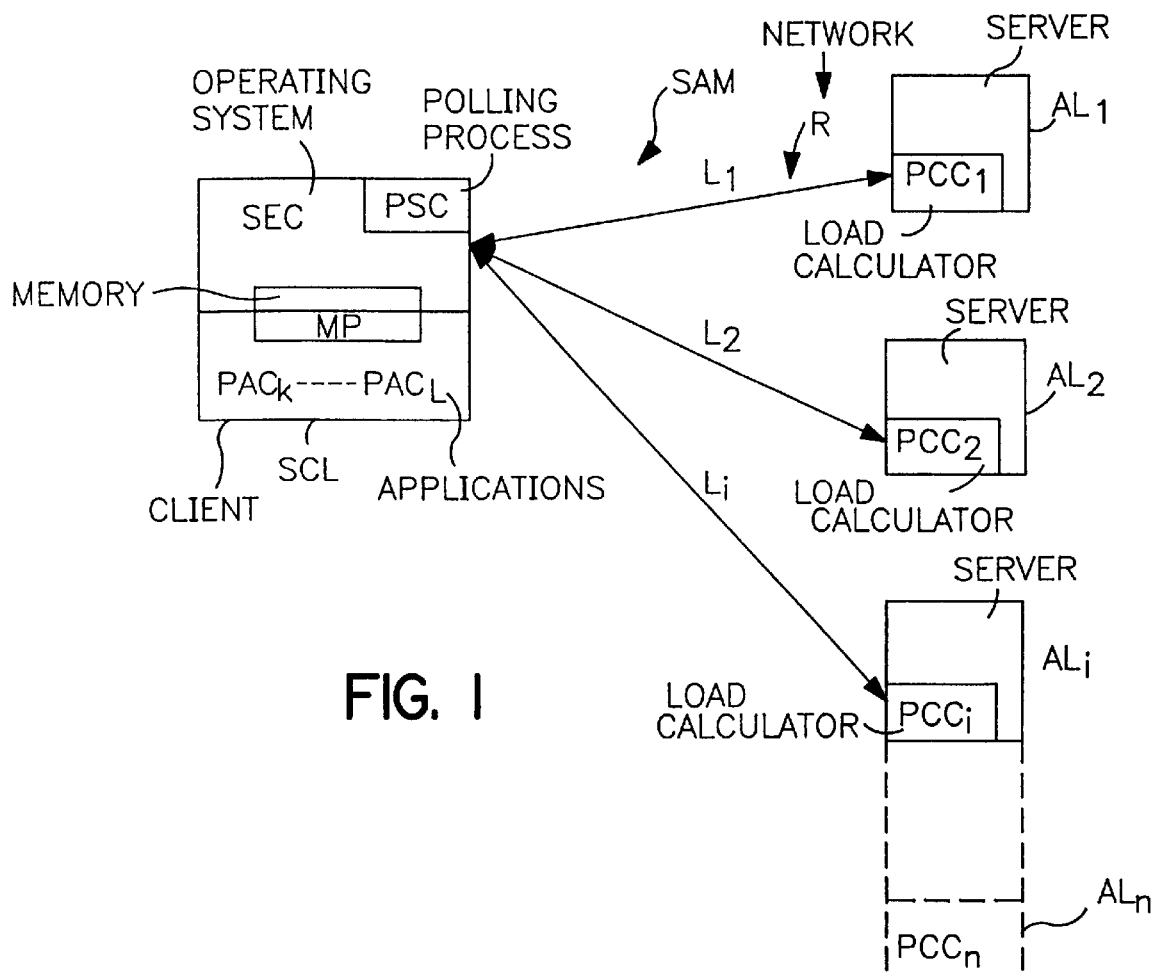
FIG. 1 is a general diagram which shows an open computing system with multiple servers according to the invention.

Referring now to FIG. 1, the open computing system with multiple servers SAM according to the invention includes:

The client system SCL,

The multiple servers AL1, AL2, . . . ALi, . . . ALn.

In the description which follows, the servers will be designated by the name allies, with the understanding that the two terms are equivalent.

The client SCL and the allies are linked to one another by means of a network R, symbolized in FIG. 1 by the connections L1 through Ln which link SCL to each of the allies AL1 through ALn, respectively. The connections are of the same type and are standardized in accordance with one of the standards mentioned above. Identical connections link the allies to one another but these are not represented in FIG. 1, since they are not essential to an understanding of the invention.

The client includes:

Its operating system, namely SEC;

A polling process PSC;

A plurality of applications $PAC_k$ which run under the control of SEC;

A memory MP shared between the different applications and the polling process PSC; and A file FAC which relates to the various allies.

Each of the allies includes a load calculation process, namely PCC1, PCC2, . . . , PCCi, . . . , PCCn, which, at the first sampling instants tj whose period is X, calculates the load of the corresponding ally, and its progress as a function of time, that is the slope of the load line (for more details, refer to the description below in relation to FIGS. 3a and 3b). The load carried by an ally is a function of the utilization rate of the different elements which constitute the ally—central processor(s), memory or memories associated with the processor, input/outputs—and of the elements which constitute the network. The load on an ally depends on the nature of the application, as will be explained in more detail in the text which follows. At these same sampling instants, the load Ci of an ally ALi, along with its progress, is memorized by this ally.

The polling process PSC, at predetermined second sampling instants Tj, occurring at a period of Y, wherein period Y is greater than. X, requests each ally ALi to furnish the polling process with the slope of the load line and the average of this load calculated from a predetermined number of periods X.

When an application $PAC_k$ is being run on SCL, the application requests one of the allies, at a predetermined instant T, by means of PSC, to render predetermined services to it. These services will be rendered from the instant T0 and are expected to last for an interval of time Δt. The polling process PSC then chooses the least loaded ally to render these services. What is meant by the least loaded ally, is the ally which, among all the allies, has the minimum average load value beginning at the instant T0, for a duration equal to Δt, as predicted by the polling process PSC. This minimum value is calculated as a function of the values of the slope and of the average load predicted for each ally during this interval.

Figure 4:
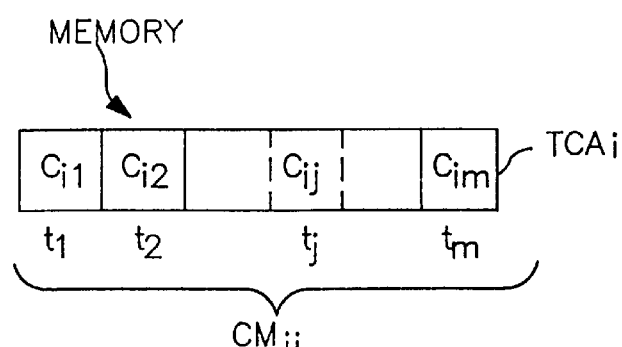
FIG. 4 shows, for a given server, the means for memorizing the load over the course of time.
Figure 2:
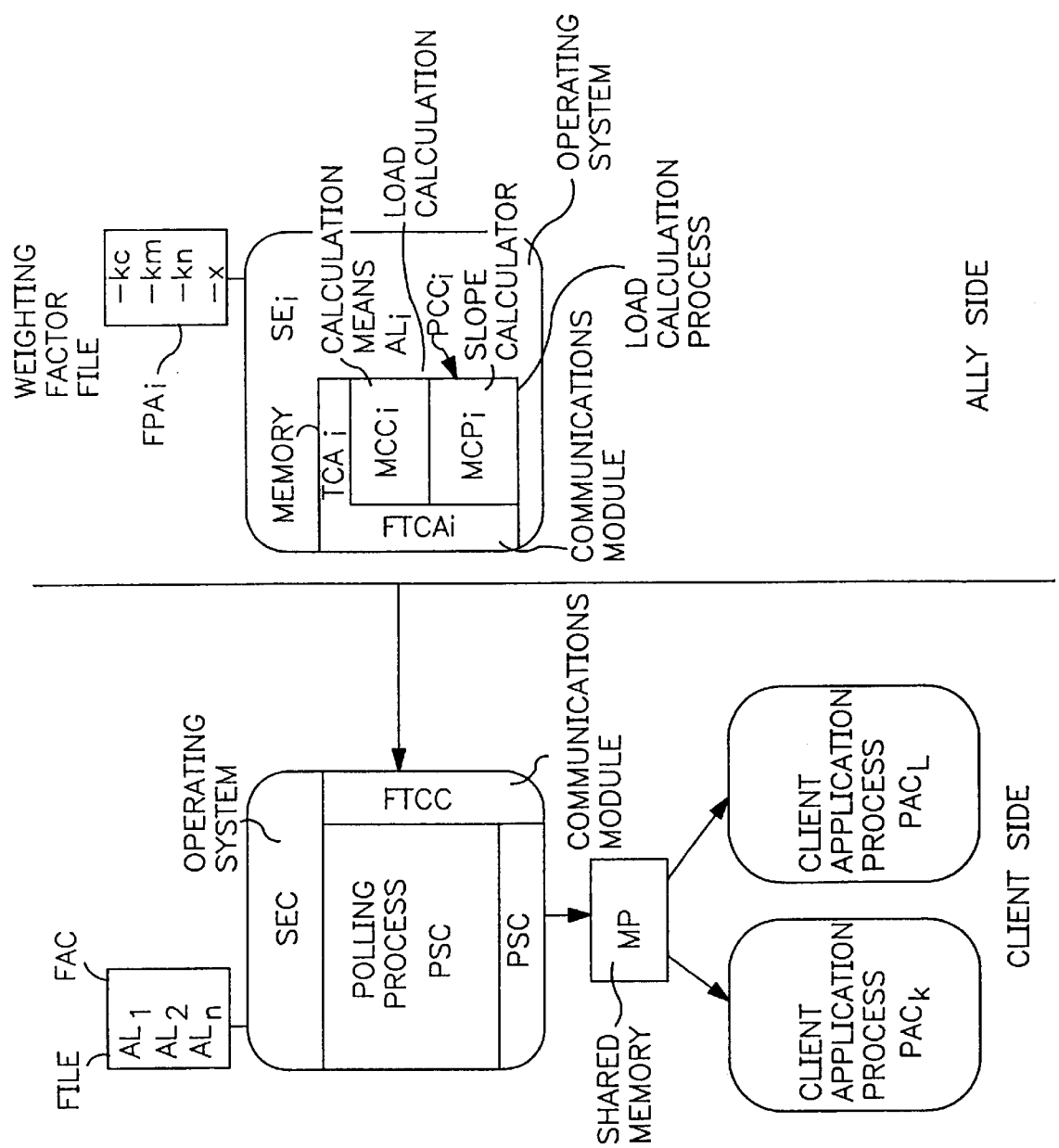
FIG. 2 is a more detailed diagram which shows a preferred embodiment of the system according to the invention, FIG. 3, composed of FIGS. 3a and 3b, shows graphs which represent the progress over the course of time of the load of several servers.

Referring now to FIG. 2, each ally ALi has its own operating system SEi which organizes the work of a plurality of processes and functions. Only the process which relates to the invention, namely the load calculation process PCCi, is of interest here. ALi also contains a memory TCAi, preferably of the circular type, which contains the value of its load Ci at a given number of successive sampling instants t1, t2, . . . tj, . . . , tm. The value of m is such that PCCi calculates the average value of the load Ci between t1 and tm, as well as the slope of the load line, with sufficient precision. This number m is determined as a function of the estimated duration of the services to be rendered. An example of TCAi is shown in FIG. 4.

The process PCCi includes: Calculation means MCCi for Ci at each of the instants tj; Means for calculating the slope of the load line, namely MCPi,—a communication module FTCAi; and A file which contains the weighting factors for the load, namely FPAi.

The calculation means MCCi calculates the load in the following way:

Ci=kc*Wcpu+km*Wmem=kn*Wnet, in which:

Wcpu is the percentage of utilization over time of the central processor of the ally ALi.

Wmem is the percentage of utilization of the memory of the ally, that is the relationship between the memory capacity actually used and the total capacity of the memory of the ally ALi.

Wnet is the percentage of utilization of the network by the ally, that is the relationship between the number of pieces of information emitted and received by ALi and the maximum throughput admissible in the network (10 Mb/s for an ETHERNET network).

Figure 5:
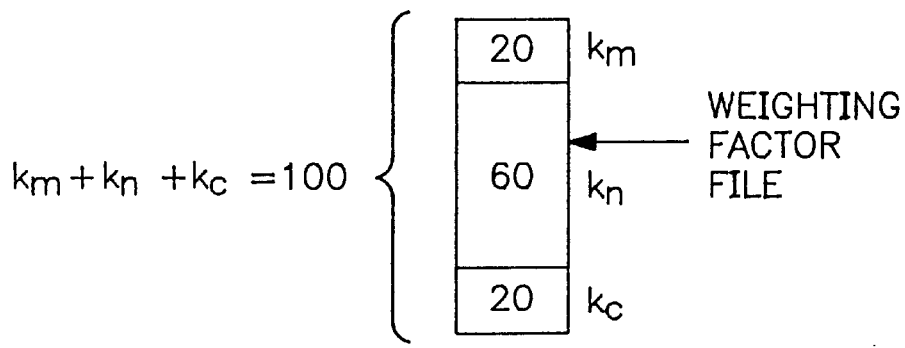
FIG. 5 shows an example of the distribution of various weighting factors, for a given application, which affect the calculation of the load of a server.

-kc, km, kn are specific weighting factors of the processor, the memory and the network. Their sum is equal to 100. Their respective values depend on the nature of the application being run on the client. Thus, considering FIG. 5, kn=60, and km=kc=20, since this example relates to an application which mainly utilizes the network R. Consequently, the weighting factor kn relative to the network is quite substantial, in any case more substantial than the two other factors.

When the calculation means MCCi calculated the load Ci for the instants t1 through tm, the various corresponding values were memorized in the memory TCAi, in the manner indicated in FIG. 4. Thus, the values Ci1, Ci2, . . . Cij, . . . , Cim which relate to these same instants appear from left to right in FIG. 4. Moreover, it is possible to establish the load line which gives the progress of the load as a function of time. Several examples of such lines are given in FIG. 3. In order to obtain each one of them, one looks for whichever one of the various points would be closest to it (mathematical method of least error squares). Each of the points has as its ordinate the load Cij and as its abscissa the time tj.

Figure 3A:
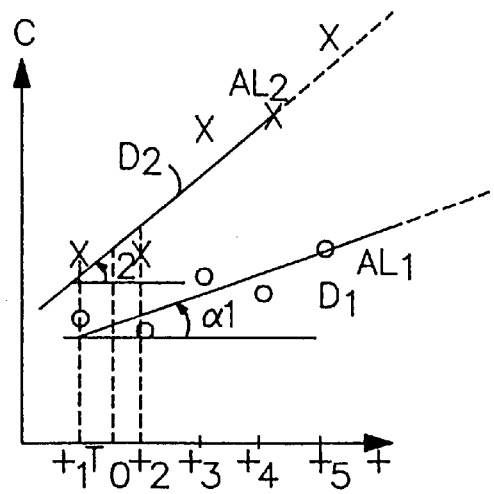
Figure 3B:
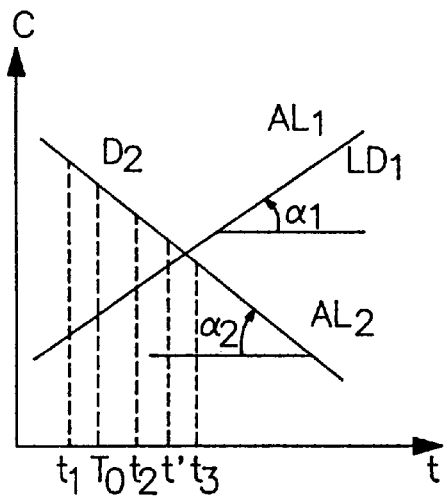

Referring now to FIGS. 3a and 3b, which each show two load lines D1 and D2 which relate to the allies AL1 and AL2 In FIG. 3a, the load lines D1 and D2, and which, between the instants t1 and t2, have positive slopes α1 and α2, the latter being greater than α1. All the loads which relate to the line D2 are greater than those which relate to the line D1. Consequently, if, at the instant T0 between t1 and t2, an application $PAC_k$ of the client SCL desires the services of an ally (here assumed to be chosen from between AL1 and AL2), the client will choose AL1 whose load indicated by the line D1 is less than that of AL2 indicated by D2.

In FIG. 3b, the lines D1 and D2 intersect at the instant t' between t2 and t3. This indicates that their respective slopes have opposite signs. α1 is positive while α2 is negative. Consequently, if the utilization time of the services requested by $PAC_k$ is between t1 and t2, the client will choose AL1, whose average load between these instants is less than that of AL2.

The load calculation means MCCi also calculates, for the benefit of the client SCL, the average of the load Ci of the ally ALi for a duration equal to a predetermined number m of periods X. The corresponding loads Ci1 through Cim are added together and divided by the number of samplings m. This average of the load is then sent to the client SCL at its request, every other i.e. at every sampling interval having a period of Y, by means of the communication module FTCAi.

The calculation of the slope of the load line is carried out by the method of least error squares. This is accomplished by the means for calculating the slope MCPi.

The file FPAi contains, for each ally ALi, the various weighting factors kc, km, kn, which are furnished to it by the user of the client application $PAC_k$. The value of X is also furnished by the user and it depends on the precision that the user intends to give to the definition of the load lines.

Returning to FIG. 2, to examine in a more detailed manner the function of each of the constituent elements of the client SCL: It will be noted that in this same figure, a second application $PAC_l$ has been represented in order to clearly illustrate the fact that several applications can run on the same client, as is well known to one skilled in the art. It is evident that the reasoning applied here to a single application $PAC_k$ applies equally to a plurality of applications. Thus, the following text will be limited to considering a single $PAC_k$.

The operating system SEC of the client SCL is, for example, of the Unix or proprietary type (for example the GCOS7 or GCOS8 type available from the assignee of the instant invention and described in the user manuals for the DPS7000 and DPS9000 systems marketed by same).

The file FAC contains the list, regularly updated by the user, of all the allies ALi associated with the jobs being done by the client at a given moment, along with their following characteristics: address, name, status (running or not running). The value of the period Y is chosen directly by the user according to the same criteria as is used for the period X.

The polling process PSC is associated with a communication module FTCC, whose role is identical on the client side to that of FTCAi on the ally ALi side. These two modules communicate with one another by means of call procedures of a known type, for example RPC described in the user manuals published by the instant assignee. The data DCi which they exchange relate to the average load and to the slope of the load line of ALi at the second sampling instants Tj of the period Y of SCL.

As soon as polling process PSC has obtained the data DCi ($\alpha$, CMij), they are stored in a table TCCi assigned to Ali (see also FIG. 4). The tables TCCi which contain the data DCi are each a subset of a general table TCC. Each table TCCi contains the name, the address, the status, the average load, and the slope of Ali.

The choosing means MDC associated with PSC select the least loaded ally by polling all the tables TCCi and, as soon as this is done, posts its references in the shared memory MP.

Consequently, when any application $PAC_k$ (which one skilled in the art also calls a "client application process," see FIG. 2) needs an ally ALi to render services to it, (it will be recalled that in general, it requests services at an instant T, so that they will be rendered to it at an instant TO subsequent to T and that the estimated duration of the services is estimated at t, see explanations given above), it accesses the shared memory MP and consequently, finds in it the references of the least loaded ally ALi. Then, by means of the modules FTCC and FTCAi, it requests this ally to render the services it requires, beginning at TO.

While the preferred forms and embodiments of the invention have been illustrated, it will be apparent to those of ordinary skill in the art, that various changes and modifications may be made without deviating from the invention concepts and true spirit and scope of the invention as set forth above, and is intended by the appended claims to define all such concepts which come within the full scope and true spirit of the invention.

We claim:

1. An open computing system (SAM) with multiple servers (ALi), including a central client (SCL) connected through a communication network (R) with a plurality of servers (AL1, . . . , ALi, . . . , ALn), wherein the client is operable to run a plurality of applications (PACK) which use services available through the servers, the client and the servers being able to belong to heterogenous computing environments, said open computing system comprising:

1) for each of the servers (ALi):
   load calculation means (MCCi) for calculating, at predetermined first sampling instants having a period of X, a load on each of said servers as a percentage of utilization of hardware resources of each servers and of the network;
   means for calculating a progress rate of the load on each of the servers, at the first sampling instants; and
   first means for memorizing the load and the progress rate calculated at the first sampling instants, 2) wherein the client (SCL) includes:
   means (PSC) for polling each server, at predetermined second sampling instants having a period of Y, to request each server to furnish the progress rate of the load and an average of the load on each of the servers, wherein the average of the load is calculated for a predetermined number of periods X;
   second means for memorizing the progress rate of the load and the average of the load (TCCi, TCC, MP) for all the servers at second sampling instants; and
   means for choosing (MDC) a least loaded server during an estimated time period (TO, TO+$\Delta$t) in which services requested by an application running on the client must be rendered.

2. The system according to claim 1, wherein the means for memorizing the load includes a circular memory which stores as many values of the load as there are first sampling instants, the number of first sampling instants being determined as a function of the estimated time period during which services are to be rendered.

3. The system according to claim 1, wherein each server includes a central processor and a memory associated with the processor, the load being calculated by the load calculation means (MCCi) as follows:

$$\text{Load}=kc*Wcpu+km*Wmem+kn*Wnet,$$

in which:

Wcpu is a percentage of utilization over time of the central processor of the server;

Wmem is the percentage of utilization of the memory of the server;

Wnet is the percentage of utilization of the network (R) by the server; and

–kc, km, and kn are specific weighing factors for the processor, the memory and the network, respectively.

4. The system according to claim 1, wherein the means for calculating the progress rate of the load calculates the slope of a load line corresponding to the load using a least error squares method.

5. The system according to claim 3, wherein each server (ALi) includes a file which contains the specific weighing factors kc, km, kn, wherein the specific weighing factors are furnished by a user of an application running on the client along with a value for the period X, the value for the period X depending on a precision which the user desires for the load.

6. The system according to claim 1, wherein the second means for memorizing include as many tables (TCCi) as there are servers, each of the tables being assigned to one of the servers, wherein the tables include a server name, address, status, average load, and progress rate of the load.

7. The system according to claim 6, wherein the means for choosing (MDC) chooses the least loaded server by polling all the tables and by posting references to the least loaded server in a memory (MP) shared between the applications and the polling process (PSC).

8. The system according to claim 7, wherein each application ($PAC_k$) includes means for reading the shared memory (MP) to determine which server is the least loaded server and requests the least loaded server to render the services.

* * * * *